No. 702,154. Patented June 10, 1902.
J. H. & W. C. QUIGGIN.
TABLE TENNIS NET.
(Application filed Mar. 8, 1902.)
(No Model.)
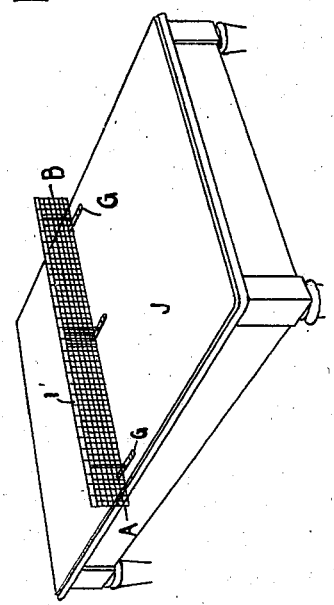
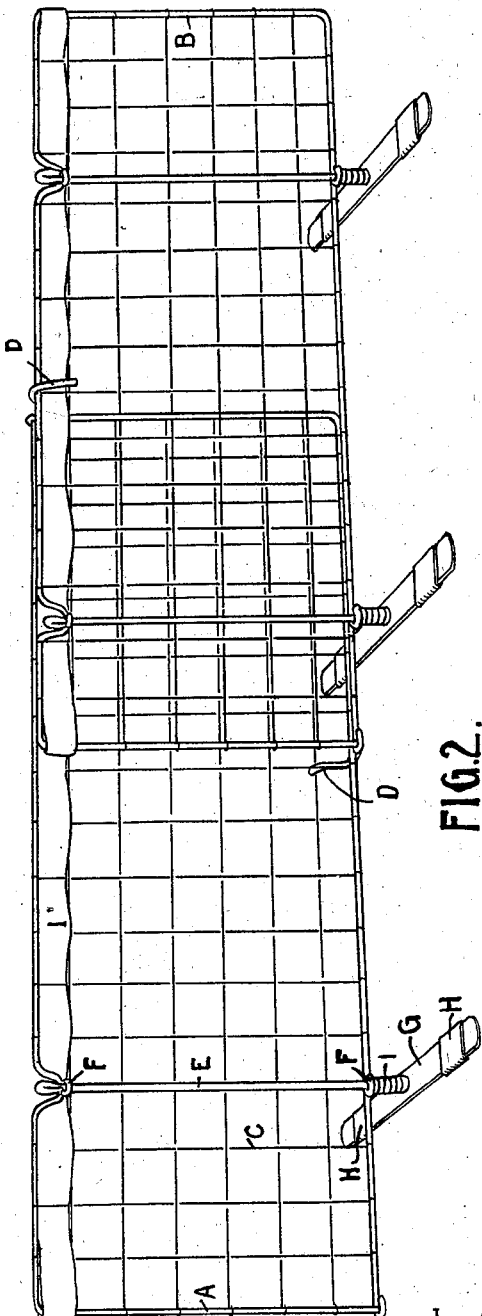

UNITED STATES PATENT OFFICE.

JAMES HENRY QUIGGIN AND WILLIAM CHARLES QUIGGIN, OF LIVERPOOL, ENGLAND.

TABLE-TENNIS NET.

SPECIFICATION forming part of Letters Patent No. 702,154, dated June 10, 1902.

Application filed March 8, 1902. Serial No. 97,261. (No model.)

*To all whom it may concern:*

Be it known that we, JAMES HENRY QUIGGIN and WILLIAM CHARLES QUIGGIN, ironmongers, subjects of the King of Great Britain, residing at Liverpool, in the county of Lancaster, England, (whose full postal address is 45 Ranelagh street, Liverpool, England,) have invented certain new and useful Improvements in Table-Tennis Nets, (for which application has been made in England, No. 19,476, dated September 30, 1901,) of which the following is a specification.

This invention has for its object a very simple and cheap form of table-tennis net which can be adjusted to any size of table, and yet will fold up into a very small compass.

In the accompanying drawings, Figure 1 is a general view of a tennis-net in position on a table; Fig. 2, a detail view of the net on a larger scale.

Our invention consists in making the net of metallic netting with legs or feet near the end, preferably also of metal, and in forming it in two or more pieces hooked or buttoned together in any convenient manner. In its simplest form the net proper consists of two rectangles A and B, of stout wire, with wire-netting C filling the rectangle. At the top end of one, A, and the bottom end of the other, B, is a hook D, so that when the two rectangles A and B are placed together, so as to overlap, the hook D of one piece of netting engages the top edge of the other piece of netting B and the hook of the latter engages the bottom edge of the piece A, as clearly shown in the drawings, thus forming a rigid connection. The two rectangles when put together are somewhat longer than the widest table to be used. Consequently they can be arranged to fit a great variety of width of table. In order to enable them to stand upright, we arrange on the terminal post at one end of each piece of netting or at some short distance therefrom, as shown in the drawings, a swiveling bar E, which bar passes through loops F in the framework and is provided with feet G, which can be swiveled at right angles, and thus act as a firm leg, or be swiveled so as to be in line with the net to facilitate packing.

I represents sleeves or coils of wire placed between the feet G and the bottom eyes F, so as to keep the rectangles a suitable distance above the level of the feet.

H represents pieces of rubber fixed to the feet, which make the latter very rigid and will not injure a polished surface.

Near the opposite end of one only of the rectangles we provide a similar swiveling bar E, with feet G, and it is onto this end that the end of the other rectangle hooks, so that the one rectangle supports the other rectangle at the part where it overlaps by means of the hooks D and the foot G, thus forming a rigid connection.

I' is a white tape fixed to the top, whereby a direct line of sight is obtained.

We declare that what we claim is—

1. A table-tennis net comprising a net of two or more separate pieces of wirework which can be placed alongside each other and caused to overlap, with means for holding them together with sufficient rigidity so as to adjust the length of the net to fit different-size tables.

2. A table-tennis net consisting of two rectangular frames filled in with wire-netting, appliances for securing them together, such frames being provided with feet or supports which when in use are at right angles to the network, but can be turned so as to be in line therewith and pack in a small compass, substantially as set forth.

3. A table-tennis net, comprising two rectangular frames, one having a bottom hook and the other a top hook, to respectively overlap each other, and a series of swinging supports for the rectangular frames; substantially as described.

In witness whereof we have hereunto signed our names, this 26th day of February, 1902, in the presence of two subscribing witnesses.

JAMES HENRY QUIGGIN.
WILLIAM CHARLES QUIGGIN.

Witnesses:
G. C. DYMOND,
JOHN McLACHLAN.